3,766,288
PROCESS FOR PREPARATION OF
ALKENYLBENZENE
Takeo Shima, Takanori Urasaki, and Iwao Omae, Iwakuni, Japan, assignors to Teijin Limited, Osaka, Japan
No Drawing. Filed Mar. 27, 1972, Ser. No. 238,584
Claims priority, application Japan, Mar. 29, 1971, 46/18,602
Int. Cl. C07c 3/52
U.S. Cl. 260—668 B         9 Claims

ABSTRACT OF THE DISCLOSURE

A process for preparing alkenylbenzenes, which comprises reacting alkylbenzenes with 1,3-butadiene at an elevated temperature in the presence of an alkali metal catalyst in the substantial absence of oxygen and moisture, wherein such catalyst is composed of (1) 0.005 to 0.4% by weight, based on the alkylbenzene, of metallic potassium, and
(2) metallic sodium in an amount expressed by the following equation $$(4.1x+2.0) \geq Na \geq (-0.073x+0.05)$$

wherein x represents the amount in weight percent of the metallic potassium.

---

This invention relates to an improved process for preparing alkenylbenzenes by reacting alkylbenzenes with 1,3-butadiene in the presence of an alkali metal catalyst, wherein the catalyst is inexpensive and can be separated very easily from the reaction product at a good recovery ratio as compared with the conventional catalyst, and wherein the handling of the catalyst and the safety of the reaction operation are greatly improved.

Alkenylbenzenes such as 5-(o-tolyl) pentene-(2) obtained by reacting alkylbenzenes such as o-xylene with 1,3-butadiene are industrially valuable compounds because they can be converted to naphthalene dicarboxylic acids by cyclization, dehydrogenation and subsequent oxidation. The naphthalene dicarboxylic acids are useful as materials of polymers.

A method has already been known to produce alkenylbenzenes by reacting alkylbenzenes with 1,3-butadiene at an elevated temperature in the presence of an alkali metal other than lithium (see U.S. Pat. 3,244,758). This method, however, has the defect that where the alkenylbenzenes are desired in high yields, a great quantity of metallic potassium, which is expensive, must be used. According to the single example given in this U.S. patent, a supported catalyst prepared by finely pulverizing $Na_2O$ and supporting molten metallic potassium thereon is employed in an amount of about 0.57% based on the alkylbenzene, and no description is given as to the yield of the product.

Extensive research and development work has now led to the discovery that by conjointly using a smaller amount of metallic potassium, and metallic sodium in an amount of a specific range relative to the amount of the metallic potassium, the use of a support can be avoided, and the intended alkenylbenzene can be produced in a good yield and at a lower cost as a result of the reduced amount of metallic potassium (e.g., about 20 to 30% lower). It has also been found that the catalyst composed of metallic potassium and sodium, especially their alloy, can be separated and recovered from the reaction product mixture easily and in a high recovery ratio, and the separating operation and the recovery ratio can thus be improved. Furthermore, it has been found that the amount of metallic potassium which is susceptible to oxygen and moisture and therefore, strictly requires the exclusion of these can be reduced to an extent such that it does not provide a commercially satisfactory yield of the product when used singly; and accordingly, that restrictions imposed on the handling of the catalyst and the reaction operation can be improved. It has also been found that in the prior art method, the catalyst unavoidably remains in the product as a result of poor separation and recovery, and it is necessary to deactivate or remove it in an additional step, but that according to the present invention, such a step can be totally omitted.

Accordingly, an object of this invention is to provide an improved process for preparing alkenylbenzenes in high yields and at low cost using a catalyst composition which is less costly and can be separated from the reaction product in an improved recovery ratio.

It is another object of this invention to provide a process for preparing alkenylbenzenes in which the handling of the catalyst, the reaction operation and the safety of equipment can be improved.

Many other objects and advantages of this invention will become more apparent from the following description.

The catalyst used in the process of this invention is a catalyst system composed of:

(1) 0.005 to 0.4% by weight, preferably 0.01 to 0.2% by weight, especially 0.02 to 0.1% by weight based on the alkylbenzene, of metallic potassium, and
(2) metallic sodium in an amount expressed by the following equations:

$$(4.1x+2.0) \geq Na \geq (-0.073x+0.05)$$

preferably, $$(3.68x+1.46) \geq Na \geq (-0.26x+0.102)$$

especially, $$(3.8x+0.95) \geq Na \geq (-0.63x+0.2)$$

wherein $x$ in each equation represents the amount of metallic potassium used in (1).

These alkali metals can be used in the form of a mixture, but it is especially desirable that they be used in the form of an alloy.

If metallic potassium is used in an amount in excess of that specified above, it only results in an increased cost of the catalyst and the product, and does not give rise to any improvement in yield. Also, the specific yield defined hereinbelow becomes poor. Furthermore, such excessive amounts cause disadvantages with respect to the handling of the catalyst, the reaction operation, and the safety of the reaction equipment. In addition, the separation and recovery of the catalyst from the reaction product become difficult, and the ratio of recovery is reduced. On the other hand, if the amount of metallic potassium is below the above-specified range, the product cannot be obtained in a good yield even if the amount of metallic sodium is increased. If the amount of metallic sodium is greater than the above-specified range, the yield of the product and the specific yield become poor even if the amount of metallic potassium is within the above-specified range. On the other hand, if the amount of metallic sodium is below the above-specified range, the yield of the product and the specific yield are reduced even if the amount of metallic potassium is within the specified range. Also, this involves poorer separation and recovery of the catalyst from the reaction product.

It is preferred that at least 80% by weight of the catalyst composed of metallic potassium and metallic sodium has a particle size in the range of 0.05 mm. to 3 mm. The particle size is deterined by the Andreasen pipette method (Chemical Engineers' Handbook, 4th edition, J. H. Perry, pages 8–5, McGraw-Hill, 1963). The measurement is carried out in an n-heptane solution at room temperature, while maintaining the space part in a dry nitrogen atmosphere. The results are calculated from Stokes Law. In calculation, the densities of metallic sodium, metallic potassium and their alloy are those described in Mellor's Comprehensive Treatise on Inorganic and Theoretical Chemistry, Vol. II, Supplement II, p. 548, Longmans, Green and Co. Ltd., 1961).

If the particle size is smaller than the above specified range, the separation and recovery of the catalyst from the reaction product become difficult and the ratio of recovery of the catalyst tends to be reduced. On the other hand, if the particle size is too large, the yield of the product tends to become lower. Therefore, the employment of the above-specified particle size is preferred.

Where the catalyst composed of metallic potassium and metallic sodium is used in the form of an alloy, these metals are mixed in the molten state in the absence of oxygen and moisture, in a well known manner. The absence of oxygen and moisture can be provided, for example, by purging the space of the mixture with a dry inert gas such as nitrogen or argon. Or these metals are shut off from oxygen by immersing them in a solvent such as xylene, benzene, toluene, or heptane. The alloy can also be obtained, as is well known, by heating metallic soduim and a potassium compound such as potassium carbonate, potassium hydroxide or potassium halide in the absence of oxygen and moisture.

The process of the present invention is carried out by reacting alkylbenzenes with 1,3-butadiene in the substantial absence of oxygen and moisture at an elevated temperature.

The starting alkylbenzenes that are useful in the present invention are compounds in which at least one alkyl group having 1 or 2 carbon atoms is attached to the benzene nucleus, nad can be expressed, for example, by the following formula

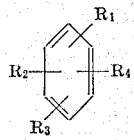

wherein $R_1$ is an alkyl group having 1 or 2 carbon atoms, and $R_2$, $R_3$ and $R_4$ may be the same or different and represent a hydrogen atom or an alkyl group having 1 to 3 carbon atoms. Preferred alkylbenzenes are toluene, xylene, ethylbenzene, trimethylbenzene, and tetramethylbenzene.

Usually, the reaction is carried out at 90 to 170° C., preferably 90 to 150° C. The mol ratio of 1,3-butadiene to the alkylbenzene can be optionally chosen from those already known. For example, the mol ratio of the alkylbenzene to 1,3-butadiene is 1:0.005 to 0.3, preferably 1:0.02 to 0.2. The reaction can be performed either continuously or batchwise. In the continuous method, a multiplicity of reaction zones may be provided. In the batchwise method, the reaction time of 1 to 10 hours is frequently employed. Where the reaction is carried out continuously, the reaction time (residence time) is about 0.5 to 10 hours, preferably about 1 to 6 hours.

No particular restriction is imposed on the reaction operation, and it is only required that the alkylbenzene comes in sufficient contact with 1,3-butadiene in the presence of the catalyst. However, since a resinous or gummy substance, presumably a polymer of 1,3-butadiene, adheres to the inlet of the 1,3-butadiene and tends to block the inlet, it is preferred that instead of introducing 1,3-butadiene alone into the alkylbenzene in which the catalyst is present, a mixture of 1,3-butadiene with the alkylbenzene, for example, a liquid mixture of 1,3-butadiene and alkylbenzene or a liquid-gaseous mixture of gaseous butadiene and alkylbenzene be introduced therein. Alternatively, 1,3-butadiene is fed into a space in the reaction zone, and allowed to be absorbed and reacted with the surface of the alkylbenzene liquid in which the catalyst is present to thereby prevent blockage.

After completion of the reaction, the catalyst can be separated from the reaction product by any known method, for example, by liquid-liquid separation and subsequent separation of the separated lower layer, or by separating the solid phase from the liquid-solid mixture at a lower temperature, for example, by filtration or centrifugal separation. According to the present invention, because of extremely good separability of the catalyst, the separation of the used catalyst can be easily performed by the so-called decantation in which the reaction mixture is allowed to stand, and the mixture is separated into two phases or the metal catalyst that precipitates is separated. Since metallic sodium and metallic potassium have a greater specific gravity than that of the reaction mixture, they are separated and settle downwards either as liquid or solid. At this time, compounds difficultly soluble in the reaction mixture also settle together with the metal catalyst, but they are separated by decantation together with the metal catalyst. The separated difficultly soluble compounds can be recycled together with the metal catalyst for re-use. The details of these difficultly soluble compounds are not fully known, but experiments indicate that they aid in the catalytic action of the metal catalyst.

When the catalyst is separated and recovered by decantation in accordance with a preferred embodiment of this invention, the operating temperature should be such that the specific gravity of the separated matter is larger than that of the reaction product, usually at a temperature of at least about 80° C., preferably from about 90° C. and up to 150° C., since a temperature exists at which this difference in specific gravity occurs.

When the separated metal catalyst and the difficultly soluble compound are repeatedly recycled for re-use, it sometimes happens that the difficultly soluble compounds deposit in excessive amounts. If desired, they can be removed out of the reaction system. The separation of the difficultly soluble compounds from the metal catalyst can be performed by treating the mixture with a solvent selected from water, alcohols such as methanol or ethanol, carboxylic acids such as acetic acid or stearic acid, phenols and alkylbenzenes either alone or in admixture, usually at a temperature of 30 to 400° C., preferably 90 to 150° C., followed by decantation, filtration or centrifugal separation, etc.

The metal catalyst so recovered by decantation can be recycled to the reaction system with or without supplying fresh metals. It is possible to melt the recovered metal catalyst together with a suitable amount of fresh metal to form an alloy, prior to re-use.

The present invention will be described in greater detail by the following examples and comparative examples.

In the following examples and comparative examples, the specific yield, the separability of catalyst after the reaction, and the recovery ratio of the catalyst after the reaction were determined in accordance with the following definitions.

Specific yield $$\text{Specific yield (S.Y.)} = \frac{\text{Yield of the product (weight)}}{\text{Amount of the catalyst metals consumed (weight)}}$$

Smaller S.Y. values mean poorer yields of the product, and larger S.Y. values mean larger yields of the product, both when economy is also taken into consideration.

Separability of catalyst after reaction: After completion of the reaction, the temperature of the reaction system is adjusted to 110° C., and stirring is temporarily stopped. After a lapse of 10 minutes, the liquid near the surface is sampled, and the amount of the metal catalyst contained in the sampled liquid is measured by an atomic absorption analysis, and expressed in percent. This percentage expresses the separability. The larger this value is, the poorer the separability is, and the small it is, the better the separability is, if the amount of the catalyst is the same.

Recovery ratio of the catalyst after reaction $$\text{Recovery ratio} = \left(1 - \frac{\text{Amount of the metal catalyst consumed (weight)}}{\text{Amount of the metal catalyst introduced into the reaction system (weight)}}\right) \times 100$$

The amount of the metal catalyst consumed is measured and calculated as follows:

(1) After completion of the reaction, stirring is continued, and a predetermined amount of the reaction mixture liquid is sampled. Ethyl alcohol is added to the sampled liquid (A grams) at room temperature in an amount of 20% by weight of the sampled liquid. Then, the amount of hydrogen gas evolved (B cubic centimeters) at 20° C. and 1 atm. is measured.

The amount of the metal catalyst (mol/grams of the reaction mixture liquid) is calculated from the measured value in accordance with the following equation.

$$\text{Amount of the metal catalyst} = \frac{B \times \frac{273}{293} \times \frac{1}{22400} \times 2}{A}$$

(2) About 0.5 g. of metal catalyst is sampled from the reaction product liquid, and 20 cc. of ethyl alcohol are added thereto, and the reaction is performed. The reaction liquid is analyzed by an atomic absorption analysis, and the ratio of sodium to potassium is determined.

From the results obtained in (1) and (2) above, the amount C(grams per gram of the reaction product liquid) of metallic sodium and potassium in the reaction product is calculated.

(3) The amount (D) of metallic potassium and metallic sodium newly added to the reaction system is theoretically determined as the amount in grams of the metal catalyst per gram of the reaction product.

(4) From the above results, the amount (E) of the catalysts consumed is determined by the following equation $$E = D - C$$

Examples 1 to 2 and Comparative Examples 1 to 7

In a dry nitrogen stream, 5 g. (0.58% by weight based on the starting xylene) of metallic sodium and 0.5 g. (0.06% by weight based on the starting xylene) of metallic potassium were melted and mixed to produce an alloy, and 860 g. of o-xylene substantially dehydrated were added. In a nitrogen stream, the mixture was heated to 110° C., and stirred for 30 minutes at a stirring speed of 600 r.p.m. Then, 43 g. of 1,3-butadiene were introduced in the course of 6 hours, and reacted with the o-xylene. After completion of the reaction, the reaction product liquid was stirred, and a sample was taken from the stirred liquid for measurement of the amount of the metal catalyst consumed. Stirring was temporarily stopped, and in 10 minutes, a sample for testing the separability of the catalyst was extracted from the reaction product liquid maintained at 110° C. The remaining reaction product liquid was maintained at 110° C. and subjected to decantation to separate it into the catalyst and a liquid phase containing the intended product. The liquid phase containing the product was distilled at a reduced pressure of 22 mm. Hg abs., and a fraction boiling at 115–125° C. was withdrawn to form the intended 5-(o-tolyl)pentene-(2). The amount of the product was 105.7 g. including the amounts of the samples previously withdrawn.

When the same alloy as above which was prepared separately was stirred under the abovementioned conditions, it had a particle size of 0.4 to 1.0 mm.

The above procedure was repeated using varying amounts of the metallic sodium and metallic potassium in the alloy. The results together with those of Example 1 above are shown in Table 1.

TABLE 1

| Number | Catalyst composition | | | | Product | | Catalyst in the reaction product (percent) | |
|---|---|---|---|---|---|---|---|---|
| | Amount based on o-xylene (wt. percent) | | | Particle size (mm.) | Yield (gr.) | Specific yield (S.Y.) | Separability | Recovery ratio |
| | Na | K | Total amount | | | | | |
| Comparative Example 1 | 0.64 | | 0.64 | 0.4–1.0 | 33.0 | 75.0 | 0.051 | 92 |
| Comparative Example 2 | | 0.64 | 0.64 | 0.4–1.0 | 108.3 | 78.8 | 0.352 | 75 |
| Example 1 | 0.58 | 0.06 | 0.64 | 0.4–1.0 | 105.7 | 190.0 | 0.069 | 90 |
| Comparative Example 3 | 0.58 | | 0.58 | 0.4–1.0 | 31.5 | 63.1 | 0.58 | 90 |
| Comparative Example 4 | | 0.06 | 0.06 | 0.4–1.0 | 36.1 | 87.6 | 0.53 | 20 |
| Compartive Example 5 | | [1] 0.57 | 0.57 | <0.1 | 105.7 | 25.4 | 0.518 | 15 |
| Comparative Example 6 | | [2] 0.73 | 0.73 | <0.1 | 103.5 | 20.6 | 0.642 | 20 |
| Example 2 | 0.49 | 0.08 | 0.57 | 0.4–1.0 | 108.2 | 163.0 | 0.082 | 86.5 |
| Comparative Example 7 | 4.00 | | 4.00 | 0.4–1.0 | 63.2 | 45.9 | 0.160 | 96 |

[1] Na₂O.  [2] CaO.

Examples 3 to 9 and Comparative Examples 8 to 11

The procedure of Example 1 was repeated except that the starting material, the mol ratio of the reactants, the amount of the catalyst based on the starting material, the particle size of the catalyst, the reaction temperature, etc. were changed as shown in Table 2.

The results are shown in Table 2.

TABLE 2

| | Starting materials | | Catalyst composition | | | | | | Product | | Catalyst in the product percent) | |
|---|---|---|---|---|---|---|---|---|---|---|---|---|
| | | Mol ratio of alkylbenzene to 1,3-butadiene | Amount based on alkylbenzene (wt. percent) | | | Particle size (mm.) | Reaction temperature | Type of reaction | Yield (gr.) | Specific yield (S.Y.) | Separability | Recovery ratio |
| Number | Alkylbenzene | | Na | K | Total | | | | | | | |
| Example: | | | | | | | | | 5-phenylpentene-(2) | | | |
| 3 | Toluene | 10.2:1 | 0.50 | 0.015 | 0.515 | 0.4–1.0 | 110 | Batchwise | (91.2) | 140 | 0.079 | 85 |
| | | | | | | | | | 5-(p-tolyl)pentene-(2) | | | |
| 4 | p-Xylene | 10.2:1 | 0.50 | 0.15 | 0.65 | 0.4–1.0 | 120 | do | (108.0) | 148 | 0.090 | 87 |
| | | | | | | | | | 2-phenylhexene-(4) | | | |
| 5 | Ethylbenzene | 10.2:1 | 1.5 | 0.06 | 1.56 | 0.4–1.0 | 130 | do | (99.2) | 143 | 0.078 | 95 |
| | | | | | | | | | 5-(o-tolyl)pentene-(2) | | | |
| 6 | o-Xylene | 10.2:1 | 0.50 | 0.015 | 0.515 | 0.4–1.0 | 110 | do | (100.0) | 153 | 0.078 | 85 |
| 7 | o-Xylene | 10.2:1 | 0.50 | 0.15 | 0.65 | 0.4–1.0 | 110 | do | (107.5) | 147 | 0.090 | 87 |
| 8 | do | 10.2:1 | 0.50 | 0.015 | 0.515 | 0.05–1.0 | 110 | do | (100.1) | 135 | 0.090 | 83 |
| 9 | do | 10.2:1 | 0.58 | 0.06 | 0.64 | 0.05–0.1 | 110 | do | (105.0) | 145 | 0.088 | 87 |
| Comp. Ex: | | | | | | | | | | | | |
| 8 | do | 10.2:1 | 0.50 | 0.003 | 0.503 | 0.4–1.0 | 110 | do | (51.8) | 79.8 | 0.075 | 85 |
| 9 | do | 10.2:1 | 0.50 | 0.45 | 0.95 | 0.4–1.0 | 110 | do | (108.5) | 95.8 | 0.304 | 85 |
| 10 | do | 10.2:1 | 0.04 | 0.06 | 0.10 | 0.4–1.0 | 110 | do | (50.7) | 98.1 | 0.070 | 38 |
| 11 | x-Xylene | 10.2:1 | 3.0 | 0.06 | 03.06 | 0.4–1.0 | 110 | do | (92.5) | 87.9 | 0.122 | 96 |

Example 10

A 70-liter stirred continuous reaction vessel was charged with 40 kg. of substantially anhydrous o-xylene, and an alloy consisting of 200 g. of metallic sodium and 20 g. of metallic potassium. The temperature of the reaction vessel was raised to 110° C., and stirring was performed for one hour. At least 80% by weight of the alloy catalyst had a particle size of 0.2 to 0.5 mm. Then, dehydrated 1,3-butadiene and dehydrated o-xylene, introduced from the inlet at the bottom of the reaction vessel, were fed at a rate of 0.50 kg. per hour and 15 kg. per hour, respectively, and the reaction was initiated.

The reaction product was withdrawn at a predetermined rate through a pipe inserted in the central part of the reaction vessel, so that about 45 kg. of the product were always present in the reaction vessel. The withdrawal of the reaction product liquid was performed by means of a decanter of 10 liter capacity connected to the reaction vessel. The reaction liquid was transferred to the decanter, and the supernatant liquid was withdrawn by this decanter. The catalyst separated by the decanter was continuously returned to the reaction vessel.

On the other hand, a suspension of finely dispersed alloy consisting of 3 g. of sodium and 3 g. of potassium per kilogram of o-xylene was fed to the reaction vessel at a rate of one kilogram per hour. By this procedure, the process was operated for 10 days. The supernatant liquid withdrawn was distilled at a reduced pressure of 22 mm. Hg abs., and a fraction boiling at 115 to 125° C. was extracted to form the intended 5-(o-tolyl)pentene-(2) at a rate of 1.21 kg. per hour.

The specific yield was 202; the separability was 0.039%; and the recovery ratio was 93.1%.

Example 11

Using an apparatus of the same type as used in Example 10, the procedure of Example 10 was repeated for 14 consecutive days except that the amounts of sodium and potassium initially charged were 450 g. and 80 g. respectively, the amounts of sodium and potassium to be additionally fed were 3.2 g. and 4.8 g. respectively per kilogram of o-xylene, and the suspension was fed to the reaction tank at a rate of one kilogram per hour. The intended 5-(o-tolyl)pentene-(2) was obtained in an amount of 1.22 kg. per hour. The specific yield was 152.5; the separability of the catalyst was 0.052%; and the recovery ratio was 96.0%.

What we claim is:

1. A process for preparing alkenylbenzenes, which comprises reacting alkylbenzenes with 1,3-butadiene at a temperature of 90–170° C. in the presence of an alkali metal catalyst in the substantial absence of oxygen and moisture, wherein said catalyst consists essentially of
   (1) 0.005 to 0.4% by weight, based on the alkylbenzene, of metallic potassium, and
   (2) metallic sodium in an amount expressed by the following equation $$(4.1x + 2.0\% \text{ by weight}) \geq Na \geq (-0.073x + 0.05\% \text{ by weight})$$

wherein $x$ represents the amount, in weight percent, of metallic potassium.

2. The process of claim 1, wherein the amount of metallic potassium is 0.01 to 0.2% by weight, and the amount of metallic sodium is expressed by the following equation $$(3.68x + 1.46\% \text{ by weight}) \geq Na \geq (-0.26x + 0.102\% \text{ by weight})$$

wherein $x$ is the amount of the metallic potassium.

3. The process of claim 2, wherein the amount of metallic potassium is 0.02 to 0.1% by weight, and the amount of metallic sodium is expressed by the following equation $$(3.8x + 0.95\% \text{ by weight}) \geq Na \geq (-0.26x + 0.2\% \text{ by weight})$$

wherein $x$ is the amount of metallic potassium.

4. The process of claim 1, wherein at least 80% by weight of said catalyst has a particle size of 0.05 to 3 mm.

5. The process of claim 1, wherein the mol ratio of said alkylbenzene to 1,3-butadiene is 1:0.005–0.3.

6. The process of claim 1, wherein after completion of the reaction, the catalyst is separated and recovered by decantation, and recycled to the reaction system for re-use.

7. The process of claim 2, wherein at least 80% by weight of said catalyst has a particle size of 0.05 to 3 mm.

8. The process of claim 3, wherein at least 80% by weight of said catalyst has a particle size of 0.05 to 3 mm.

9. The process of claim 5 wherein the mol ratio of said alkylbenzene to 1,3-butadiene is 1:0.02–0.2.

References Cited
UNITED STATES PATENTS

| | | | |
|---|---|---|---|
| 1,934,123 | 11/1933 | Hofmann et al. | 260—668 B |
| 2,603,655 | 7/1952 | Strain | 260—668 B |
| 3,291,847 | 12/1966 | Warner | 260—668 B |
| 3,006,976 | 10/1961 | Shaw et al. | 260—668 B |

CURTIS R. DAVIS, Primary Examiner

U.S. Cl. X.R.

260—671 A